United States Patent

Cesaraccio et al.

[11] Patent Number: 5,839,551
[45] Date of Patent: Nov. 24, 1998

[54] PISTON AND PISTON-ROD GUIDE UNIT FOR HYDRAULIC SHOCK ABSORBERS

[75] Inventors: Christian Cesaraccio, Montbeliard, France; Jordi Macarulla Bombardo, Bellaterra, Spain; Jesús Acedo Rosas, Barcelona, Spain; Antonio Romero Fernandez, Vilassar de Mar, Spain

[73] Assignee: Sintermetal, S.A., Ripollet, Spain

[21] Appl. No.: 645,593

[22] Filed: May 13, 1996

[51] Int. Cl.$^6$ ........................................................ F16F 9/36
[52] U.S. Cl. .................. 188/322.17; 188/322.18
[58] Field of Search .................. 188/322.17, 322.18, 188/322.22, 322.15, 316, 317

[56] References Cited

U.S. PATENT DOCUMENTS

| | | | |
|---|---|---|---|
| 3,722,640 | 3/1973 | Taylor | 188/322.22 X |
| 4,442,987 | 4/1984 | Legrand et al. | 244/110 B |
| 4,445,598 | 5/1984 | Brambilla | 188/322.17 X |
| 4,497,394 | 2/1985 | Ferrand et al. | 188/322.18 X |
| 4,934,667 | 6/1990 | Pees et al. | 188/322.18 X |
| 5,364,543 | 11/1994 | Bosna et al. | 252/12.2 |

Primary Examiner—Lee W. Young
Attorney, Agent, or Firm—Michael J. Striker

[57] ABSTRACT

In the piston and piston-rod guide unit for hydraulic shock absorbers the piston-rod guide (2) includes an annular piece (3) provided with a central orifice (5) for the piston rod and an elastic sealing ring (4), and the piston (1) is a body of revolution with a convex generatrix. The external surface of the piston is coated with an anti-friction piston coating (9) advantageously including polytetrafluoroethylene and having a uniform piston coating thickness. The central orifice (5) of the annular piece has an internal wall coated at least partially with a guide coating (6) having a uniform guide coating thickness equal to that of the piston coating (9) and a coating composition which is the same as that of the piston coating. These coatings (6,9) are between 20 to 60 micrometers thick and are charged with ceramic particles and a pigment in the polytetrafluoroethylene, in order to reduce friction and improve wear resistance.

7 Claims, 2 Drawing Sheets

PISTON AND PISTON-ROD GUIDE UNIT FOR HYDRAULIC SHOCK ABSORBERS

BACKGROUND OF THE INVENTION

This invention relates to a piston and piston-rod guide unit for hydraulic shock absorbers, of the type habitually used for automobile suspension units.

The guide is of a kind which includes an annular piece, provided with a central orifice for passage of the piston rod and an elastic seal ring for the hydraulic fluid.

BACKGROUND OF THE INVENTION

Widely known in the art are an extensive variety of embodiments of pistons and guides for the piston rods of hydraulic shock absorbers. In the twin-tube type of shock absorber, for example, such guides generally include an annular body fitted onto the corresponding ends of both tubes, hydraulically separating the exterior and interior chambers formed by the coaxial layout of said tubes, with a non-friction bushing known as a DU bushing fitted onto the annular body, and sealing means to prevent the fluid emerging to the exterior, such as O-rings, oil seals, pressure washers, etc., which are usually made from materials of an elastic nature.

Similarly, in shock absorbers of this type the part known as piston is one of its main components, being generally made up of a sintered body which constitutes the piston as such, some membranes, some springs, some washers and a non-friction strip.

The known embodiments of pistons and guides for piston rods such as those described present as their main disadvantage the fact that they are made up of a large number of components, which on the one hand means high production cost and, on the other, high assembly cost.

SUMMARY OF THE INVENTION

In order to overcome the aforesaid disadvantages, this invention presents a hydraulic shock absorber piston and piston-rod guide unit of new structure, which completely eliminates the above-mentioned disadvantages.

In accordance with the present invention, the piston and guide unit covered by the invention is characterized in that the piston is made up of a single piece comprising a body of revolution with a convexly curved generatrix with the external surface of the piston and the internal wall of the central orifice of the annular piece being provided, at least partially, with respective coatings of uniform thickness formed by application onto the external surface of the piston and onto the walls of the central orifice of the annular piece, respectively, of a material which reduces friction and improves wear resistance, such as polytetrafluoroethylene (PTFE), with a charge of ceramic particles and a pigment.

In accordance with another characteristic of the invention, the charge of ceramic particles preferably includes mullite and titanium oxide, in a proportion by weight ranging between 5% and 25% of the total weight.

According to another characteristic of the invention, the coatings of the wall of the central orifice of the annular piece and of the external surface of the piston have a uniform thickness of between 20 and 60 micrometers.

In accordance with another characteristic of the invention, the piston is a body revolution, preferably of barrel-shaped, whose generatrix is a convexly curving line of a radius between 700 and 1,300 millimeters.

According to another characteristic of the invention, the wall of the central orifice of the guide is formed by a body of revolution, the generatrix of which is provided with at least one straight cylindrical part and at least one end part of diameter increasing towards one of the edges of the central orifice.

BRIEF DESCRIPTION OF THE DRAWINGS

The attached drawings provide illustration, by way of non-restrictive example, of a form of embodiment of a piston and piston-rod guide unit for hydraulic shock absorbers in accordance with the invention.

DETAILED DESCRIPTION OF AN EXAMPLE OF EMBODIMENT

Figure 1:
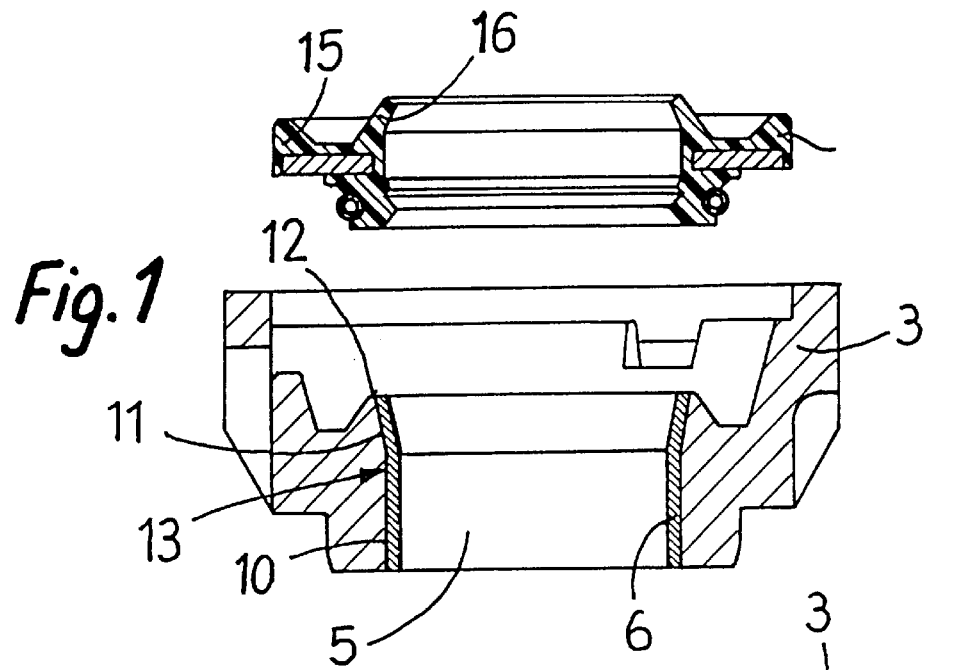
FIG. 1 is a longitudinal section view of a guide of the invention, with the elastic ring and the annular piece detached and in correlative fitting position.

A piston and a piston-rod guide unit for hydraulic shock absorbs in accordance with the present invention has a piston 1 article is made up of a single piece 7, formed by a body of revolution with a convexly curving generatrix, provided on its external surface with an external coating 9 which covers it at least partially. The hydraulic fluid passage orifices 14 can be noted on the body of the piston. In its turn, the guide 2 for piston rods of hydraulic shock absorbers of the invention, which is part of the illustrated exemplary embodiment includes an annular piece 3, provided on the wall of its central orifice 5 with a coating of uniform thickness, and an elastic sealing ring 4 which acts as a hydraulic fluid seal.

For the purposes achieving greater clarity of the drawings show the guide 2 for rods of the invention in the way it can be supplied from origin for fitting onto the corresponding end of a twin-tube hydraulic shock absorber, of the type habitually used for automobile suspension units.

Figure 2:
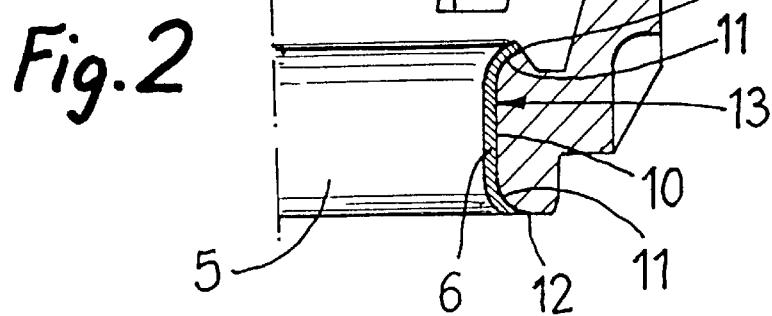
FIG. 2 shows a partial view, in longitudinal section, of another embodiment of the annular piece.
Figure 3:
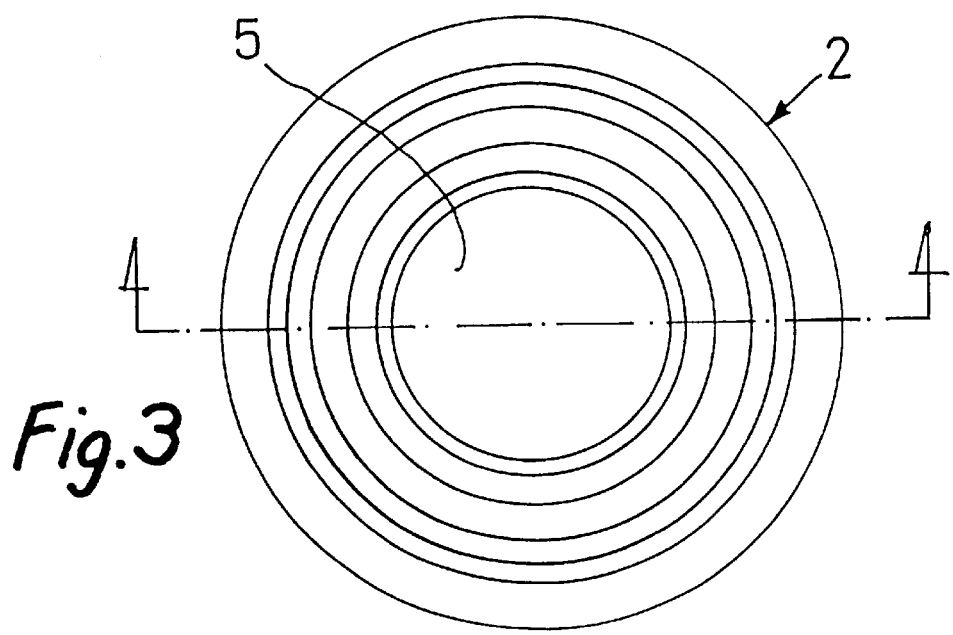
FIG. 3 shows a plan view of the guide of FIG. 1.
Figure 4:
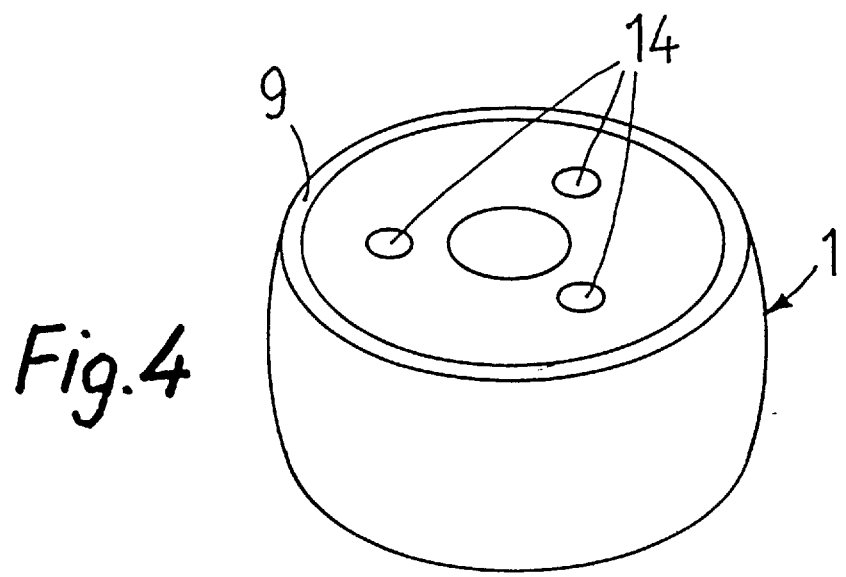
FIG. 4 shows a perspective view of a preferred form of embodiment of a piston.
Figure 5:
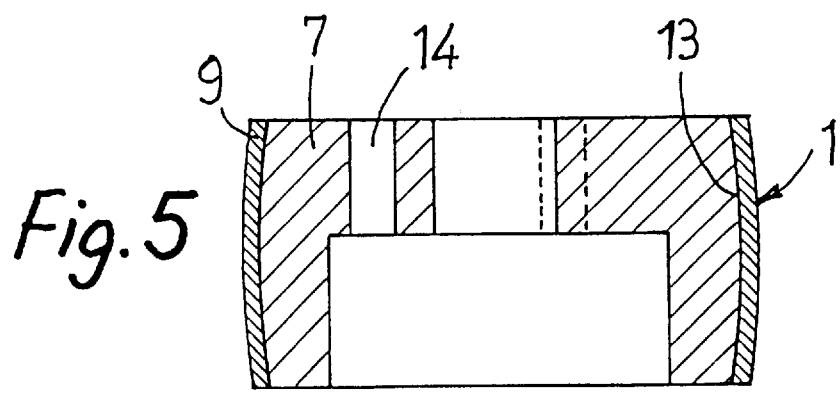
FIG. 5 is a section view of the piston of FIG. 4.

The annular piece 3 is made from sintered steel, and in the exemplary embodiment shown in FIG. 1 it has central orifice 5 whose generatrix 13 is formed by a cylindrical part 10 and a truncated cone part 11, while in the exemplary embodiment shown in FIG. 2 it includes a part 10 which is also cylindrical and two convexly curved parts 11. It is taken as understood that the orifice 5 can have any other configuration, as long as it at least includes a cylindrical part and at least another end part of diameter increasing towards either one of the edges 12 of the orifice 5, without this affecting the essential nature of the invention.

The coatings 9 and 6 are obtained by application onto the external surface of the piston 1 and onto the wall of the central orifice 5 of the annular piece 3 of a material formed preferably of particles of polytetrafluoroethylene (PTFE) and a charge of ceramic particles and pigment. The charge of ceramic particles preferably includes mullite, while the pigment advantageously includes titanium oxide.

The coverings 6 and 9 of the wall of the central orifice 5 of the annular piece 3 and of the external surface of the piston 1, respectively, have a uniform thickness of between 20 and 60 micrometers.

On the basis of the tests carried out, it has been found especially advantageous to use a material in which the proportions in which the components are mixed are as follows: polytetrafluoroethylene (PTFE), between 75% and 95% by weight of the total; and charge of mullite and pigment, between 5% and 25% by weight of the total.

Prior to said projection the application of the material which constitutes the coatings 6 and 9, the surface of the wall of the central orifice 5 and the external surface of the piston 1 are submitted to a prior treatment in order to provide suitable conditions of adherence of the material. Such treatment may consist, for example, in a shotblasting and subsequent application of a primer, such as a chromic primer, a silane-type primer or any other primer.

The application of the material onto the external surface of the piston 1 and onto the wall of the orifice 5 of the annular piece 3 configures coatings 9 and 6, respectively.

Preferably, the elastic sealing ring 4 includes a central body 15 of generally cylindrical shape, with a perimetral extension 16 of relatively low thickness.

Having provided sufficient description of the nature of the invention and of the manner of implementing it in practice, it is recorded herein that anything which does not alter, change or modify its fundamental principle may be subject to variations of detail, the matter set out in the claims below constituting the essentials of the invention and the matter for which patent of invention is sought.

We claim:

1. A piston and piston-rod guide unit for a hydraulic shock absorber, said unit comprising a piston (1) having a piston rod and a piston-rod guide, wherein said piston-rod guide (2) comprises an annular piece (3) provided with a central orifice (5) for passage of the piston rod and an elastic sealing ring (4); wherein said piston (1) consists of a single piece (7) formed by a body of revolution having a convex generatrix and an anti-friction piston coating (9) at least partially coating an external surface of said single piece, said piston coating has a uniform piston coating thickness; and wherein the central orifice (5) of the annular piece (3) has an internal wall and a guide coating (6) at least partially coating said internal wall, said guide coating (6) has a uniform guide coating thickness equal to that of said piston coating (9), said guide coating has a coating composition which is the same as that of said piston coating and said coating compositions of said guide coating and of said piston coating reduce friction and improve wear resistance.

2. The unit as defined in claim 1, wherein said coatings (6,9) are made of polytetrafluoroethylene charged with ceramic particles and a pigment.

3. The unit as defined in claim 2, wherein said ceramic particles and said pigment comprise mullite and titanium oxide respectively and each of said coatings contains between 5% and 25% by weight of a total amount of said mullite and said titanium oxide.

4. The unit as defined in claim 1, wherein said coating thickness of each of said coatings (6,9) is between 20 to 60 micrometers.

5. The unit as defined in claim 1, wherein said convex generatrix is a convex line having a radius between 700 and 1300 millimeters.

6. The unit as defined in claim 1, wherein said body of revolution is barrel-shaped.

7. The unit as defined in claim 1, wherein said central orifice has two edges at opposite ends thereof and comprises at least one straight cylindrical part and at least one curved end part of increasing diameter towards one of said edges.

* * * * *